April 26, 1932.    F. HASSELL    1,855,799
COLD WHITE LIGHT
Filed Sept. 28, 1925
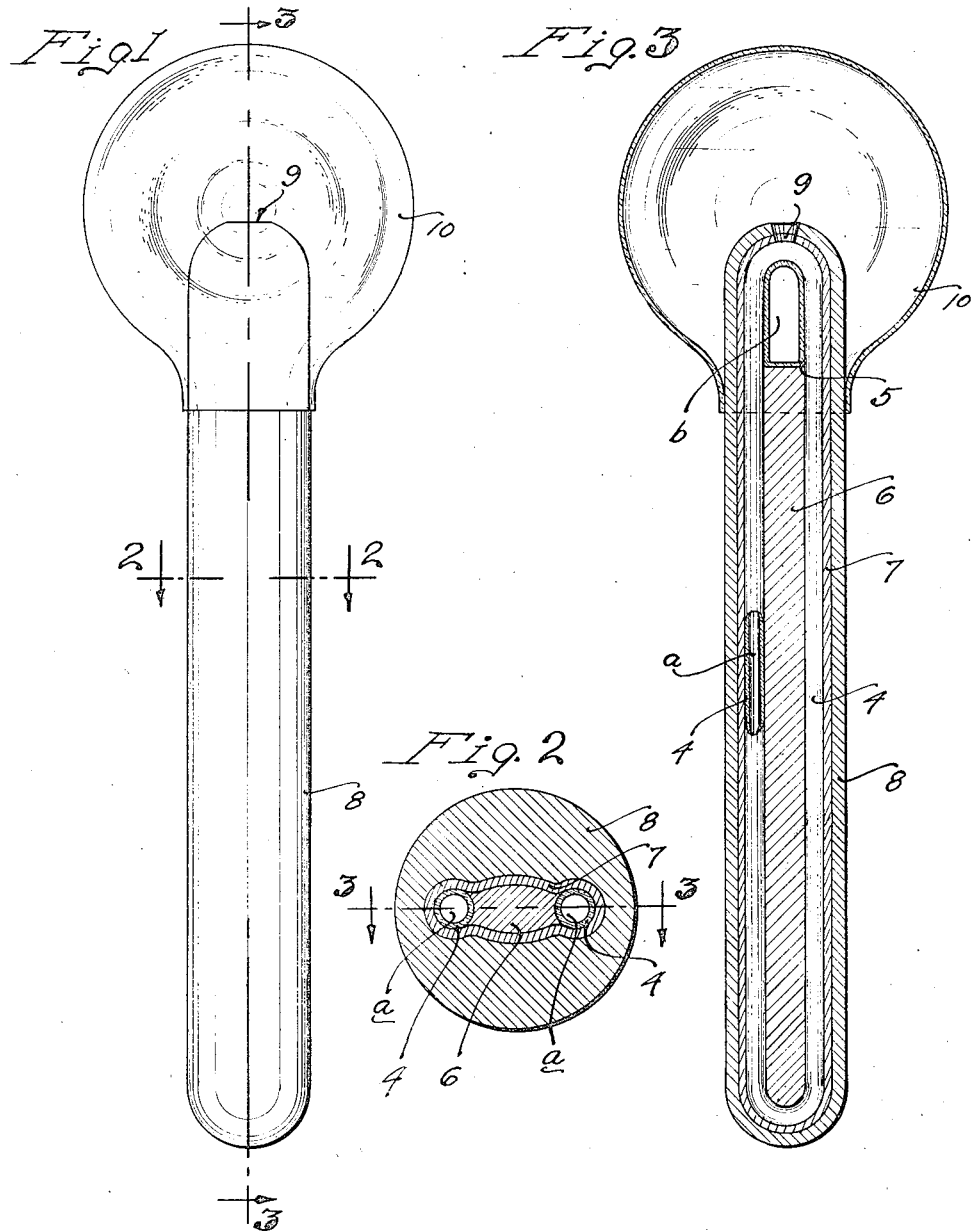
Inventor
Fred Hassell
By his Attorneys Patented Apr. 26, 1932

1,855,799

UNITED STATES PATENT OFFICE

FRED HASSELL, OF MINNEAPOLIS, MINNESOTA, ASSIGNOR TO JOHN C. RISVOLD, OF MINNEAPOLIS, MINNESOTA

COLD WHITE LIGHT

Application filed September 28, 1925. Serial No. 59,243.

My invention provides an improved process or method of and device for producing cold white light, or a light that has substantially such characteristics. In a sense, this result is a kind of phosphorescence produced by a new method and by a novel device or means, in that the luminescence is caused by exposure to sunlight or other radiation and lasts for a very long time after exposure has ceased. Under natural causes, phosphorescence is produced in various different ways, as by the oxidation caused by the decay of wood or organic matter, and by living organisms, such as certain insects that have the faculty of emitting light without appreciable heat.

My method and means for the production of cold light differs, however, very materially from any of the above enumerated or other known sources, causes or actions. My invention is based on the use of certain substances, which, when exposed to light and especially to sunlight, will be subjected to chemical or analogous change, thereby storing up therein energy which, for a very long time after the exposure to the light has ceased, will emit light rays and produce what is usually known as "white" light without appreciable heat.

In the method hereinafter disclosed and device or apparatus hereinafter described, wherein the general objects of my invention are obtained, I use as the present best known agent a colloid, preferably a metallic colloid, which has been acted upon and rendered capable of thereafter emitting light rays, by having been disposed in and influenced by a substance capable of being effected by light, during a prior period of exposure to a suitable light, such as sunlight.

In the preferred apparatus or device, the colloid is confined in a vitreous container, such as a glass tube, and this tube is encased in or surrounded by a coat of selenium. The selenium coating is preferably covered with wax or similar protecting material. The structure just indicated is preferably but not necessarily made in the form of a cylinder or bar, and at least at one place, preferably at the end of the bar, a small opening is formed through the wax and selenium coating so as to expose a small portion of the glass tube containing the colloid, for the emission of light. In practice, I have found it very desirable to enclose the light-emitting passage of the device within a glass bulb. This glass bulb acts as a guard and protects the eyes from certain rays which, if not passed through glass, seem to have a harmful effect on the vision.

As a highly important element, I further employ a halide salt, advisably placed in a glass container, and this glass container is located near the above noted light discharge passage and closely associated with the immediately adjacent portion of the tube containing the colloid.

It is a known fact that certain halide salts, such as silver chloride, silver bromide, and silver iodide, are affected by exposure to light, especially by exposure to sunlight and similar kinds of radiant energy. I have discovered that certain colloids or colloid solutions, such as colloids of metals like silver, sodium and of calcium carbide, are chemically changed when disposed in proximity to light-sensitive substances, such as a halide compound capable of being affected by light. When such compounds or substances are exposed to the light, the colloid is given the property of thereafter radiating light, and such colloid will continue to emit luminous rays during a very long period of time.

The statements herein made as to results attained are based on experiments and facts, but the theory of action may, in some instances, be slightly incorrect or only approximately true. The following is my theory of the actions that take place:

When light-sensitive compounds, such as halide salts, in the presence of or closely associated with a colloid such as noted, are exposed to sunlight, the halides are caused to throw off certain rays which act upon the colloid and give the same the property of thereafter for a long time throwing off light rays. The halides are acted upon and caused to throw off certain rays that act upon the colloids and give the same the property of thereafter emitting a white cold light. The change that takes place in the halide salts is thought to be a reduction of the salt to a metallic state or at least to a sub-compound of the salt.

The scientist Herschel has stated that actinic rays are produced or emitted when this chemical change in the halide salt is caused to take place. The actinic rays, however, are not thought to have any beneficial or other action in the production of this cold light. There seem to be then produced rays of a very different character, which cause the above noted actions, and which rays, for the lack of a better term, I will call No. 1 rays. These No. 1 rays have a peculiar property of being absorbed by the colloid and, when the colloid is suitably contained or confined, excluded from light (except for a small light-emitting passage), and properly insulated by a suitable material, such as selenium, will emit luminous rays through said light passage for a very long period of time.

The specific steps in the method of rendering the colloid luminous and producing the cold light are as follows:

A suitable colloid is first prepared, the work being done in a dark room in which, as usual, the only illumination is furnished by a red light, which light should be kept at least a distance of ten or twelve feet from the materials handled. The colloid used may be one prepared from various metals or metallic salts. Such colloid may be made by using one part of pure metallic silver, ninety-seven parts of olive oil and two parts of graphite. The colloid used should be coagulated and to secure proper coagulation, a solution of ferric chloride may be added to the above mixture. The metal used in making the colloid solution may be powdered to the necessary fineness, which is an exceedingly fine state, and then stirred into the liquid. A metallic colloid may also be prepared by establishing an electric arc between wires of the desired metal, such as gold, silver or platinum immersed in liquid. The electric current bears off minute particles of smoke-like substance comprising the metal and diffuses the same through the liquid. Graphite can also be ground very fine and mixed carefully directly with the oil or with water. One colloid that has been successfully used is made by taking one ounce of pure gelatine and mixing with two grams of dichromate of soda and then mixing with ten percent of the volume of water and adding the silver or graphite. As previously stated, the colloid used is prepared in a dark room. These colloids should be handled in glass or china glass vessels or in pottery receptacles having glazed surfaces. After the colloid is prepared and placed in a suitable receptacle, the halide compound used is then prepared. This compound is first thoroughly washed and one ounce of the halide compound is then mixed with one-half ounce of acidified ferrous sulphate, or different quantities of said substances are mixed in the same proportion. Any one of the halide compounds affected by light may be used, the chloride being most commonly used. When the halide compound has been thus prepared, it is placed in a glass-stoppered light-proof bottle until ready for exposure.

The colloid, which has been prepared and which is in a liquid or semi-liquid state, is now placed in a suitable receptacle, such as an elongated glass tube, and the said tube is sealed. The colloid being thus placed in the tube or receptacle, a glass plate is placed on a table in a dark room and the tube with the colloid therein is disposed on this glass plate. The prepared halide compound is now removed from the stoppered bottle and this compound placed within twelve inches of the tube containing the colloid. The table should be so placed that the compound can now be exposed to a suitable light, such as daylight, and this exposure should be made for at least seventy-two hours. During the seventy-two hours' exposure, there must be at least thirty-six hours direct clear sunlight shining on the light-sensitive compound, such as the halide salt. If this period of sunlight has not been obtained, the exposure should continue until it has been obtained. It is during this exposure that the rays which are emitted by the halide salt, or light-sensitive substance, while being acted upon by the light, are absorbed by the colloid. The colloid is, during its exposure, caused to absorb No. 1 rays.

After the exposure of the halide salt in proximity to the colloid tube for the period stated, a small glass container is provided having a capacity to receive about one ounce of halide salt which has not been exposed. The halide salt, or other light-sensitive substance used, is placed in this container and sealed therein and the container is then secured in or at one end of the tube containing the colloid. The halides or other light-sensitive substances which have been exposed are now of no further use and can be destroyed. In accordance with my general practice, the tube with the colloid in, however, is now stored away for a period of from ten days to three weeks in a light-proof box. After this period, the tube is taken out and the tube and container are then coated with a comparatively thin coating of selenium. The selenium coating is then again surrounded by a coating of some inactive material, such as wax, common sealing wax having been used and found to be very suitable. The selenium coating is placed on the tube containing the colloid, to prevent any electric interference or action on the colloid by light after absorbing the No. 1 rays. The wax coating is placed on the selenium to prevent any action by the light on said selenium, and this coating is, of course, entirely opaque. A small portion at the end of the tube is left exposed, that is, not covered by the coatings. This portion is from 1/16th to 1/8th of an inch square space and is, as stated, preferably at one end of the tube and at the end adjacent which the container has been secured. The exposed end of the tube is now placed in a glass tube, such as an ordinary electric light bulb which should preferably be white or frosted, and the mouth of the bulb is tightly sealed to the side of the tube.

The colloid now emits luminous rays through the exposed end of the tube and a light is produced giving, in the light thus far constructed, an illumination of from one to eight candle power. This light will continue to give this illumination without any further change or attention for a very long period. A light constructed by me has now been giving such illumination for almost four years and quite a number of other lights have been giving illumination for long periods without any apparent deterioration except possibly a slight deterioration from noonday until dark, if the light is exposed in the daytime.

The invention is illustrated in the accompanying drawings, which show a lamp or apparatus embodying my invention.

Referring to the drawings, wherein like characters indicate like parts throughout the several views:

Fig. 1 is a plan view of the improved lamp;

Fig. 2 is an enlarged transverse section on the line 2—2 of Fig. 1; and

Fig. 3 is an axial section taken on the lines 3—3 of Figs. 1 and 2, some parts being shown in full.

In the form of lamp here illustrated, the colloid $a$ is contained in an endless glass tube 4 bent to form a flat loop with parallel sides. The halide $b$ is confined in a small glass container 5 that is placed within the loop of the tube 4 at one end thereof. The numeral 6 indicates a filler, of plaster of Paris or the like, filled in between the sides of the tube 4 but performing no other function than that of a filler and means for temporarily holding the container 5 in position. The numeral 7 indicates the selenium coating or jacket that surrounds the tube 4 and container 5. The numeral 8 indicates the wax covering that surrounds the selenium jacket and, as shown, is formed with a cylindrical exterior and rounded ends. The material 8 may be sealing wax. At that end of the cylindrical body that is adjacent to the container 5, the selenium jacket 7 and wax coating 8 are removed to form a small light-emitting passage 9 that opens against the adjacent rounded portion of the tube 4. The numeral 10 indicates a light bulb, which is placed around one end of the body 8 and encloses the light-emitting passage 9. This bulb need not be air-tight, for vacuum is not here required. The bulb is simply so applied that all light emitting will pass therethrough and the eyes will be protected from certain rays that seem to be harmful to the eyesight under extended use.

As stated, the theory of the light is that the colloid, while being simultaneously exposed with the halide salt, or other light-sensitive compound, absorbs the No. 1 rays which emanate from the halide salt during its period of exposure. Both the colloid and halide salt are, as stated, exposed at the same time. The longer the colloid is kept in darkness after the exposure, the longer it is thought the same will emit the luminous rays. After the colloid has been kept from the light and is then subsequently exposed, the absorption action appears to be reversed and the rays that were absorbed being emitted as luminous rays; the emission or dispersion of the luminous rays being at a very much slower rate than the absorption of the No. 1 rays. The rays emitted by the colloid are not apparently injurious and it is thought that the silica surrounding the colloid prevents any injurious action on the eyes from the emitted rays. While the specific effects of the rays emitted by the light have not yet been thoroughly studied, it is thought that they may have some use in surgical and therapeutic work. While the lights thus far produced have developed approximately eight candle power, stronger lights, no doubt, will eventually be made. I have been working on the development of a much stronger light, and while certain difficulties have been encountered, it is confidently expected that the light will eventually be developed to 100 candle power.

From the above description, it is seen that I have provided a cold light of white color that can be inexpensively produced and which has proven very efficient. It will, of course, be understood that various changes may be made in the constituents used, and in the substitution of equivalents therefor and in the manner of treating and assembling the constituents in the finished light without departing from the scope of the invention, which, generally stated, consists in a light capable of carrying out the objects above set forth, such as disclosed and claimed and in a process capable of carrying out the objects above set forth comprising the steps and sequence of steps disclosed and set forth in the appended claim.

What I claim is:

The method of rendering a colloid of silver, sodium or calcium carbide luminous which comprises disposing the same adjacent a halide salt capable of being changed by light and exposing said colloid and salt simultaneously to the action of light whereby said colloid absorbs certain rays emitted by said halide salt or is otherwise affected by the action of light on said salt and rendered luminous.

In testimony whereof I affix my signature.

FRED HASSELL.